March 8, 1966  R. GREINER  3,238,764
METHOD FOR MEASURING THE ACCURACY OF TIME-PIECES
Filed April 22, 1963
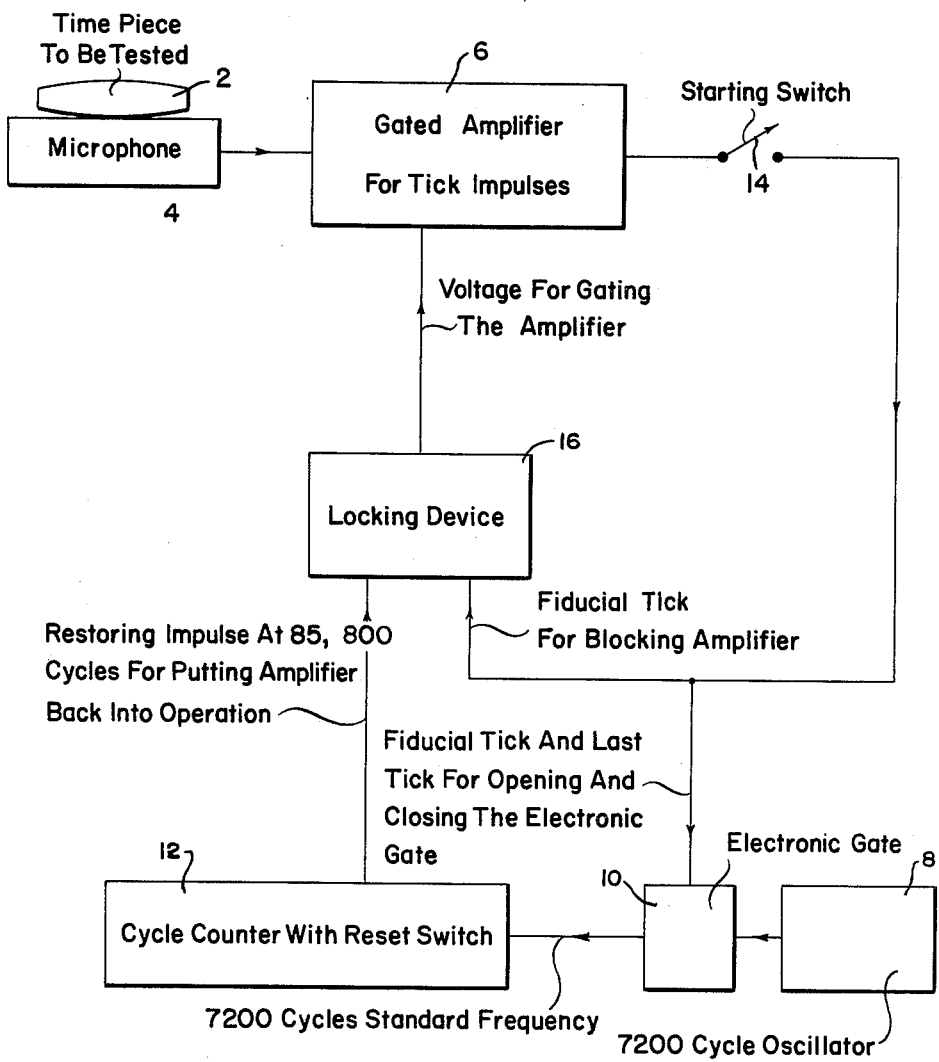
INVENTOR
*Rudolph Greiner*
BY *Lawrence E. Laubscher*
ATTORNEY United States Patent Office 3,238,764
Patented Mar. 8, 1966

3,238,764
METHOD FOR MEASURING THE ACCURACY OF TIME-PIECES
Rudolf Greiner, Eichenweg 14, Langenthal, Switzerland
Filed Apr. 22, 1963, Ser. No. 274,782
Claims priority, application Switzerland, Sept. 29, 1962, 11,435/62
5 Claims. (Cl. 73—6)

This invention relates to a method for measuring the accuracy of time-pieces.

It is known to measure the accuracy of time-pieces by counting the number of cycles of a standard frequency signal during a predetermined number of ticks of the time-piece. One tick of the time-piece under test initiates the counting of the cycles of the standard frequency and another tick, a predetermined number of ticks later, terminates the counting. For this purpose the ticks of the time-piece to be measured are picked up by a microphone, amplified and fed through a starting switch to a tick counter which counts the ticks of the time piece. At the beginning of the measuring process the starting switch is closed and the first subsequent tick closes an electronic switch, by means of which a standard frequency signal supplied by an alternating-current generator is fed to a cycle counter counting the cycles of the standard frequency. As soon as the tick counter has counted the predetermined number of ticks it generates an electrical impulse by means of which the cycle counter is immediately disconnected from the standard frequency generator. The sum of the cycles of the standard frequency fed to the cycle counter is then a measure of the accuracy of the time-piece in question, provided that it is known how many standard frequency cycles correspond to a time-piece of zero inaccuracy and the same nominal ticking rate during an identical number of ticks. A total measuring time of 12 seconds is preferred for a time-piece of zero inaccuracy, since the usual nominal ticking rates are integral multiples of this period. If a standard frequency of 7,200 cycles per second is used, then the sum of all the cycles counted by the cycle counter, less 86,400, gives the measured inaccuracy directly in seconds per day. A negative value means that the time-piece is gaining and a positive value that it is losing.

The disadvantage of this method is that the nominal ticking rate of the time-piece to be measured must be known in order that the tick counter can be set correctly. Given the above numerical values for example, the tick counter must be set to count 66 ticks before it stops the measuring process if the nominal ticking rate of the time-piece to be measured is 19,800 ticks per hour. For a hourly ticking rate of 14,400, the corresponding value to be set at the tick counter is 48 ticks. So if time-pieces of different nominal ticking rate have to be tested in a random sequence, the necessary changes have to be made to the tick counter in each case, with the result not only that the work is made more difficult but that sources of error arise due to incorrect adjustment of the tick counter.

However the chief disadvantage of the known method is that under normal circumstances the measuring results it produces are too unreliable. Any mechanical, acoustic or electrical interfering impulse which can produce a sufficiently large voltage impulse at the input of the tick counter is picked up by the latter and erroneously counted as a tick, so that the measuring process is ended prematurely and an incorrect accuracy-indication results. Tests have shown that the probability of even one such interfering impulse occurring within 12 seconds in ordinary comparatively quiet workshop or factory is quite considerable. Measuring results obtained by the known method under the usual test conditions are therefore always subject to a certain amount of uncertainty which cannot be assessed as long as each time-piece is measured only once.

The present invention relates to a method for measuring the accurracy of time-pieces, in which the number of cycles of a standard frequency signal counted between a tick initiating the measuring process and a later tick terminating the measuring process is used for measuring the accuracy of the time-piece. The deficiencies of the known method outlined above are eliminated to a very considerable extent by the invention, in that after the tick initiating the counting of the cycles of standard frequency, there is a period of waiting which is independent of subsequent ticks, the first tick after the end of the waiting period terminating the counting of the cycles of the standard frequency, and also in that the first tick after the end of the waiting period is an even-numbered tick, the tick initiating the counting of the cycles of the standard frequency counting as the zero or fiducial tick.

The various objects and advantages of the invention will become apparent from a study of the following specification when considered in conjunction with the single figure of drawing, which constitutes a block diagram illustrating the means for performing the method of the present invention.

The method according to the invention will be explained in further detail below with reference to an example, in which it will be assumed that time-pieces of the usual nominal ticking rates of 21,600, 19,800, 18,000, 16,200, 14,400 and 12,000 ticks per hour are to be measured for accuracy in any order. Time-pieces of zero inaccuracy, i.e. ticking exactly with one of the above nominal ticking rates, each give an even-number of ticks within a period of 12.0 seconds. If a standard frequency signal of 7,200 cycles per second is used, exactly 86,400 cycles of this frequency will occur within 12.0 seconds. The waiting period required by the method according to the invention begins with the tick initiating the counting of the cycles of the standard frequency, which is regarded as zero or fiducial tick. The waiting time has to be of a length conforming to the time-piece having the highest nominal ticking rate, in this case 21,600; the waiting time is then $11^{11}\!/_{12}$ seconds, and the seventy-first tick of a time-piece having a zero inaccuracy and a nominal ticking rate of 21,600 will thus occur after exactly $11^{10}\!/_{12}$ seconds and the seventy-second tick after exactly 12 seconds. The waiting time chosen consequently ends half-way, in time, between the seventy-first and the seventy-second tick of the time-piece. The blocking time of $11^{11}\!/_{12}$ seconds, expressed in the time-scale of the standard frequency, gives 85,800 cycles thereof, and the maximum measuring range is thus ±600 seconds per day deviation from the correct time-keeping.

In the case of a time-piece having any of the above nominal ticking rates but an error of less than ±600 seconds per day, the last tick within the waiting time of $11^{11}\!/_{12}$ seconds will always be of uneven number, whereas the first tick after the end of the blocking or waiting time will be of even number.

The ticking of the time-piece 2 to be tested is picked up as usual by a microphone 4 and converted into voltage impulses of short duration and amplified by means of an electronic amplifier 6. A standard frequency generator 8 for producing an electric alternating current having 7,200 cycles per second is provided and, acting through a controllable electronic gate 10, feeds an electronic cycle counter 12 by means of which the number of cycles of the standard frequency occurring while the electronic gate is open can be counted. This electronic cycle counter should be able both to count at least 87,000 cycles of the standard frequency and, on reaching 85,800 cycles thereof, to give an electric control impulse indicating the end of the waiting or blocking time of $11^{11}\!/_{12}$ seconds.

The first tick after the closing of the starting switch 14, which is counted as the zero or fiducial tick, opens the electronic gate, thus initiating the counting of the cycles of the standard frequency by the cycle counter. The apparatus has an electronic locking means 16, in the sense that none of the successive voltage impulses after the initiating tick is able to reverse the electronic gate within the waiting or blocking time. This locking may consist of the amplifier being short-circuited, interrupted or otherwise put out of action almost immediately after the initiating tick. The electric control impulse which emanates from the cycle counter and indicating the end of the waiting time must immediately put an end to the electronic locking and put the amplifier back into operation, so that the next tick after the end of the wainting time is able to close the gate through which the cycle counter is connected to the standard frequency generator and thus terminate the counting process of the cycle counter. A number between 85,800 and 87,000 is then read off the cycle counter, the difference between this number and 86,400 giving the inaccuracy of the time-piece in seconds per day.

It is clearly unnecessary to alter the apparatus in any way when time-pieces of the above nominal ticking rates are to be measured in a random succession. Moreover any voltage impulses occurring within the predetermined waiting or blocking time of $11^{11}\!/_{12}$ seconds, regardless of whether it is caused by a tick or an outside interference, can have no influence on the measured result. An interfering impulse could falsify the measured result only if it occurred in the time between the end of the waiting or blocking time and the tick following it. In the present example this time is ⅙ second at the most, and the probability of an interfering impulse occurring within this last ⅙ second is very small. It can be shown that the probability of the measured result being falsified by interference is at least 72 times less with the method of the invention than with the conventional method, where all the ticks occurring within the measurement have to be counted by means of a special tick counter. Another advantage of the method according to the invention is that the time-piece to be tested can be subjected within the waiting or blocking time to accelerated movement, change of position or other test conditions generally associated with interfering noise. A programme of various test conditions can therefore be run through during the waiting time, and the time-piece to be measured can even be lifted off the microphone during this time.

I claim:

1. A method for measuring the accuracy of time-pieces, in which a number of cycles of a standard frequency alternating signal counted between a tick initiating the measuring process and a later tick terminating the measuring process is used as a value for measuring the accuracy of the time-piece, in which after the initiating tick there is a waiting time which is independent of the subsequent ticks, in which the first tick after the end of the waiting time terminates the counting of the cycles of said standard frequency signal, and in which said first tick after the end of said waiting time is an even-numbered tick, the tick initiating said counting of the standard frequency cycles counting as the zero-numbered tick.

2. A method as claimed in claim 1, in which said waiting time extends from the initiating tick until at least midway in time between the tick terminating said counting of cycles of the standard frequency and the uneven-numbered tick immediately preceding the latter.

3. A method as claimed in claim 2, in which, when time-pieces of a different nominal rate of ticking are to be measured, the length of the waiting time corresponds with the time-piece having the highest nominal ticking rate.

4. A method as claimed in claim 1, in which said waiting time is obtained by counting a predetermined number of cycles of the same standard frequency signal as is used as a time scale for the accuracy of the time-piece to be measured.

5. A method as claimed in claim 4, in which, when a standard frequency signal of 7,200 cycles per second is used as a measuring value for the accuracy of the time-piece, said waiting time is at least 85,800 cycles of this standard frequency.

References Cited by the Examiner
UNITED STATES PATENTS
2,372,757   4/1945   Bennett _____ 73—6

LOUIS R. PRINCE, *Primary Examiner.*

STEVEN H. BAZERMAN, *Assistant Examiner.*